June 30, 1942.  H. F. HEIDEGGER  2,287,996
ADJUSTING MEANS FOR FRONT AND REAR SHUTTERS OF A MOTION PICTURE PROJECTOR
Filed July 15, 1938  2 Sheets-Sheet 1
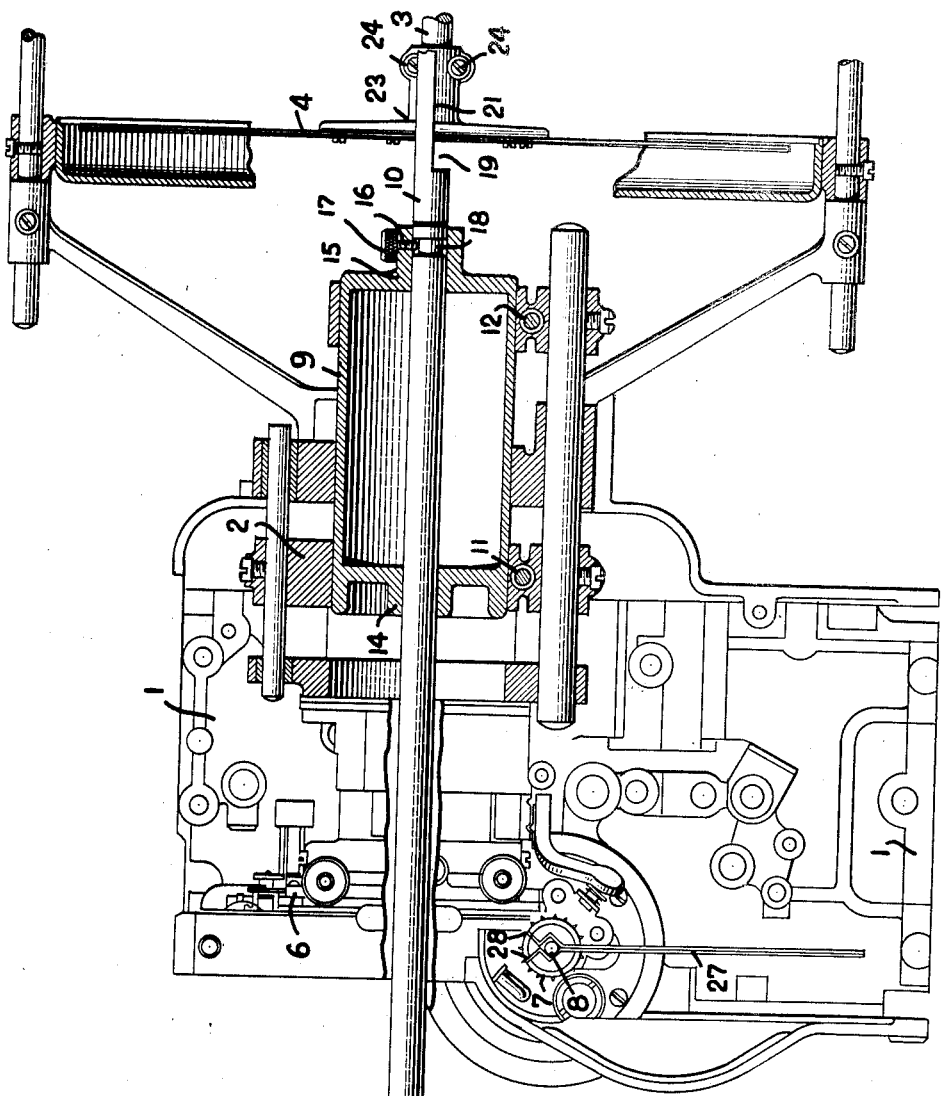
Fig.1.
INVENTOR.
Henry F. Heidegger
BY 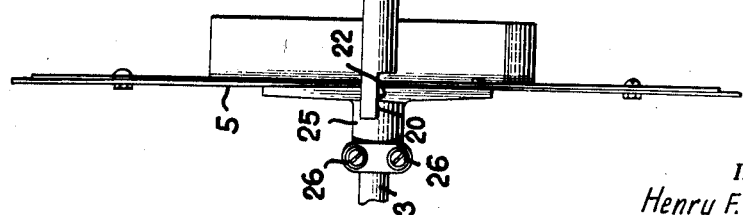
ATTORNEYS.

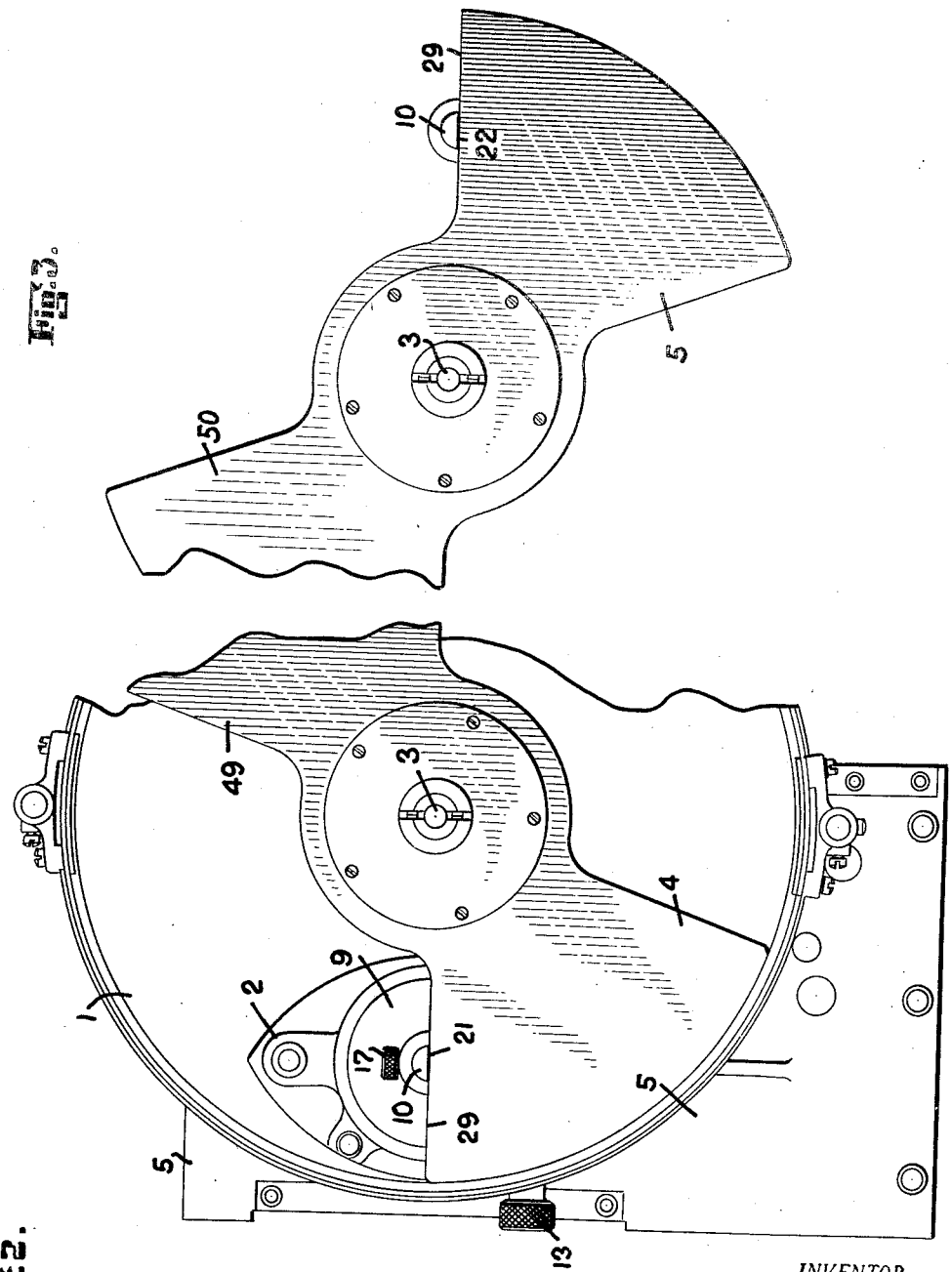

Patented June 30, 1942

2,287,996

UNITED STATES PATENT OFFICE 2,287,996

ADJUSTING MEANS FOR FRONT AND REAR SHUTTERS OF MOTION PICTURE PROJECTORS

Henry F. Heidegger, Brooklyn, N. Y., assignor to International Projector Corporation, New York, N. Y., a corporation of Delaware Application July 15, 1938, Serial No. 219,333

15 Claims. (Cl. 88—19.3)

In a motion picture projector a beam of light from an arc lamp in a lamp house is projected through a lens in the projector, which beam of light passes through the film being fed through the projector and onto the screen where it is viewed by the audience. Inasmuch as this beam of light passes through a rectangular aperture before reaching the film, the beam of light may for all practical purposes be considered as rectangular in cross section and having a center line which coincides with the center line of the conventional lens through which the light beam passes. As is well known the film is fed forward step by step, it being fed forward intermittently for a distance equal to one frame or so as to properly project one picture on the screen while the film is stationary, and at the end of the time in which it is held stationary it is again intermittently fed forward to the next picture while it is being fed by the intermittent mechanism. The beam of light should, of course, be cut off, as is well known in the art, and this light should be cut off during the entire period of such movement.

It is necessary for the shutter to complete the cutting off of the light before the intermittent mechanism starts to operate to maintain the light beam cut off while the intermittent mechanism is feeding the film forwardly, and it is also necessary for the shutter to revolve beyond the beam of light after the film has been fed. Obviously, we will get more light if the period of time during which the light is cut off is shortened as much as possible and by providing a front and a rear shutter we are able to decrease the time considerably. The upper half of the rectangular beam of light before it passes through the lens will be the lower half after it passes through the lens and the lower portion of the rectangular beam of light before it passes through the lens will be the upper portion after it passes through the lens. If therefore, the front and the rear shutters rotate in the same direction, the rear shutter need cut off only one half of the rectangular beam of light before it passes through the lens provided simultaneously the front shutter will cut off the other half of the rectangular beam of light after it passes through the lens.

In order for this to be accomplished, however, it is necessary to have the front and the rear shutters accurately adjusted so that one shutter will cut off one half of the beam of light before it passes through the lens, while the other shutter is cutting the other half of the rectangular beam of light so that this cutting off will be completed at substantially the same instant that the intermittent mechanism is ready to be operated or has completed its operation. If the shutters are properly designed, this same adjustment will cause the shutters to start to pass beyond the beam of light at the same instant that the intermittent feed mechanism completes its operation. It is the object of this invention to provide means for accomplishing this adjustment so as to secure the above named advantages and other advantages which will appear in the detailed description which follows:

The invention may be better understood by referring to the attached drawings forming a part thereof in which the same reference characters designate the same parts throughout.

In the drawings,

Fig. 1 is a side elevational view partly in cross section of a projector having my improvements incorporated therein, Fig. 2 is a front elevational view of the front shutter looking towards the rear, certain of the parts being shown fragmentarily, and Fig. 3 is an elevational view of the rear shutter looking towards the front, said shutter being shown fragmentarily.

The right hand side of Fig. 1 is considered as the front and the left hand side is considered as the rear. In other words, the light from the lamp house, not shown, would pass through the projector machine from the left to the right as viewed in Fig. 1.

The frame 1 of the projector carries a lens holder 2 into which is slipped the conventional lens, not shown. The projector is provided with the conventional shaft 3 on which the front shutter 4 and the rear shutter 5 are mounted. The film is fed through a film gate assembly 6, which is provided with the usual rectangular aperture through which the beam of light from the lamp house passes through the film and through the center of the lens in the lens holder 2. The film is pulled forward periodically by an intermittent sprocket 7 mounted on a sprocket shaft 8. As is well known in the art, the shaft 3 on which the shutters are mounted is continuously rotating and is connected with gearing, including intermittent gearing, so that the shaft 8 and the intermittent sprocket 7 will be rotated intermittently. It is also well known that the intermittent sprocket will commence its rotation each time the shaft 3 and the shutters carried thereby reach a predetermined point, so that in spite of the fact that the intermittent shaft is rotated only intermittently and the shutter shaft is rotated continuously, they are still rotated in synchronism with each other.

In order to properly position the shutters 4 and 5 on the shutter shaft 3, I propose to remove the lens from the lens holder and to remove all other mechanism which would interfere with inserting a barrel 9 within the lens holder 2 and the adjusting rod 10 through the line traveled by the beam of light between the two shutters.

It is, of course, necessary to precisely center the barrel 9 in the exact position that would be occupied by the lens so that the center line of the adjusting rod 10 which passes through the center of the barrel 9 would follow or coincide with the center line of the beam of light when the beam of light is projected through the projector. The lens holder is normally clamped to the lens by clamping screws 11 and 12 which pass through ears of the lens holder 2, the clamping screws being actuated by end knobs 13, one of which is shown in Fig. 2. In order to remove the lens it is only necessary to rotate the clamping screws so as to release the clamping action on the lens and then to slide it out of the projector. The barrel 9 is then slid into the same position occupied by the lens and is clamped into position.

The barrel 9 is provided with a rear bearing 14 and a front bearing 15, the front bearing 15 being provided with an adjustable screw 16 having a knurled knob 17 which may be rotated by hand so as to position the screw within a channel 18 in the adjusting rod 10. This is necessary because frequently the projector is mounted at an angle directing the beam of light downwardly towards the screen. In case the projector is mounted at an elevation above the screen as is usually the case, this screw 16 extending within the channel 18 prevents the adjusting rod 10 from sliding out of the barrel 9 or out of the projector. The adjusting rod 10 is provided with two cut away portions 19 and 20 at its forward and rear ends forming diametrically extending surfaces 21 and 22, which are in the same plane, the cut away portions being on the same side of the said rod. The rod 10 should be turned so that said surfaces 21 and 22 face in the same direction.

The front shutter 4 is provided with a boss 23 which, as is well known in the art, is provided with a slit so that if the clamping screws 24 are rotated in one direction, it will clamp the shutter to the shutter shaft 3. If rotated in the opposite direction, it will loosen the same. The rear shutter is provided with a similar boss 25 and clamping screws 26.

The sprocket shaft 8 extends for a short distance beyond the sprocket and I propose to suspend from the sprocket shaft an indicator 27 which is provided at its upper end with spring arms 28 which may be pressed on the sprocket shaft and held in engagement therewith by spring action.

In order to adjust the shutters relative to the movement of the intermittent sprocket, I place the barrel 9 and the shaft 10 within the projector and clamp the barrel in position. I then rotate the shaft 10 so that the surfaces 21 and 22 would be facing downwardly, although their position does not have to be exact. I then loosen the clamping screws 24 and 26 so that the shutters are free to be rotated on the shaft 3 and I place the indicator 27 on the sprocket shaft. I then rotate the gearing, not shown but which is well understood in the art, to the point where the sprocket shaft 8 commences its operation and the indicator 27 enables the operator to note that the intermittent sprocket 8 is commencing its revolution after only an extremely minute movement of the said sprocket shaft. I then rotate the front shutter 4 clockwise as viewed in Fig. 2 so that the upper surface 29 will contact the surface 21 and I then tighten the clamping screws 24 so as to secure the front shutter in this exact position on the shaft 3. I then move the rear shutter in an anticlockwise direction as viewed in Fig. 3 so that its upper surface 29 of one of the vanes of the shutter will contact the surface 22, and I then tighten the clamping screws 26 so as to position this shutter in this precise position on the shaft 3. Of course, it is immaterial which shutter is adjusted first, for the same result would be obtained in adjusting the rear shutter and then the front shutter, or the front shutter and then the rear shutter. The essential point to be remembered is that the surfaces 21 and 22 define the point to which the shutters must be moved and then clamped in position so that they would have completed cutting off one half of the light at the same instant that the intermittent sprocket is ready to commence its rotation.

Of course, it is immaterial whether the shutters rotate clockwise or anti-clockwise. In the above description I have mentioned the anti-clockwise rotation as viewed in Fig. 3 and that the surfaces 21 and 22 face downwardly. We would get the same results if the shutters rotated in the opposite direction and in this case, of course, the surfaces 21 and 22 would face downwardly.

Of course, each of the shutters 4 and 5 is provided with the conventional flicker vanes 49 and 50 as is well known in the art.

After these adjustments are made, the barrel 9 and its shaft can be removed and the lens re-inserted. Of course, the indicator 27 would also be removed and the machine is now in condition to be operated. If it is necessary to adjust the shaft 3 relative to the intermittent sprocket, some projectors have such means incorporated therein and this means therefore need not be described in this application as it forms no part of this invention.

I realize that many changes may be made in the specific form of the invention as shown in this application without departing from the spirit thereof and I, therefore, reserve the right to make such changes as may fairly fall within the scope of the appended claims.

Having now described my invention, I claim:

1. In a motion picture projector, a rotatable shaft, a front and a rear shutter adjustably secured to said shaft and adapted to cut off a beam of light passing through said projector, and an adjusting rod secured in such a position so that when the cutting edges of said shutters are moved against said rod, the shutters will be in correct position, said rod being removably secured in said projector.

2. In a motion picture projector, a rotatable shaft, a front and a rear shutter adjustably secured to said shaft and adapted to cut off a beam of light passing through said projector, an adjusting rod secured in such a position so that when the cutting edges of said shutters are moved against said rod, the shutters will be in correct position to be secured to said shaft, and means to position said rod so that its center line will coincide with the center line of the beam of light when projected.

3. In a motion picture projector, a rotatable shaft, a front and a rear shutter adjustably secured to said shaft and adapted to cut off a beam of light passing through said projector, an adjusting rod secured in such a position so that when the cutting edges of said shutters are moved against said rod the shutters will be in correct position to be secured to said shaft, means to position said rod so that its center line will coincide with the center line of the beam of light when projected, and means to prevent said rod from sliding out of the projector.

4. In combination, a rotatable shaft, a front and a rear shutter adjustably secured to said shaft and adapted to cut off a beam of light and an adjusting rod provided with diametrically extending flat faces, the rod being supported in such a position so that the flat faces are on the optical axis of the beam of light and in position to be engaged by the cutting edges of said shutters, said flat faces serving as a guide to indicate the position to which the cutting edges of said shutters should be moved to thereby correctly position said shutters relative to said shaft and means to secure said shutters to said shaft in their adjusted position.

5. In combination, a rotatable shaft, a front and a rear shutter adjustably secured to said shaft and adapted to cut off a beam of light and an adjusting rod provided with diametrically extending flat faces, said rod being cut away so as to provide diametrically extending flat faces in the same plane, the rod being supported in such a position so that the flat faces are on the optical axis of the beam of light and in position to be engaged by the cutting edges of said shutters, said flat faces serving as a guide to indicate the position to which the cutting edges of said shutters should be moved to thereby correctly position said shutters relative to said shaft and means to secure said shutters to said shaft in their adjusted position.

6. In combination, a rotatable shaft, a front and a rear shutter adjustably secured to said shaft and adapted to cut off a beam of light and an adjusting rod provided with diametrically extending flat faces, said rod being cut away so as to provide diametrically extending flat faces in the same plane, the rod being supported in such a position so that the flat faces are on the optical axis of the beam of light and in position to be engaged by the cutting edges of said shutters, said flat faces serving as a guide to indicate the position to which the cutting edges of said shutters should be moved to thereby correctly position said shutters relative to said shaft and means to secure said shutters to said shaft in their adjusted position, said flat faces being so positioned that the center line of the beam of light when projected would extend along the plane which had been formed by said flat faces at the time when said shutters were secured to said shaft.

7. In a motion picture projector, a rotatable shaft, a front and a rear shutter adjustably secured to said shaft, each of said shutters being adapted to cut off substantially one half of a beam of light, and an adjusting rod secured in such a position within the projector so that when the cutting edges of said shutters are moved against said rod, the shutters will be in their correct position to be secured to the shaft so as to cut simultaneously the center line of said beam of light.

8. In a motion picture projector, a rotatable shaft, a front and a rear shutter adjustably secured to said shaft, each of said shutters being adapted to cut off substantially one half of a beam of light, an adjusting rod having such a length and secured in such a position so that when the cutting edges of said shutters are moved against said rod, the shutters will be in position to cut simultaneously the center line of said beam of light, and means to hold said rod in the projector in position so that its center line will coincide with the center line of said beam of light when projected.

9. In a motion picture projector, a rotatable shaft, a front and a rear shutter adjustably secured to said shaft, each of said shutters being adapted to cut off substantially one half of a beam of light, an adjusting rod supported by said projector and having faces in the path of movement of said shutters, said faces being on the optical axis of said projector and serving as a means to indicate the position in which each of said shutters should be in order for them to cut simultaneously the center line of said beam of light, a lens holder, a barrel insertable in said lens holder and carrying said adjusting rod, said adjusting rod extending through the center of said barrel.

10. In a motion picture projector, a rotatable shaft, a front and a rear shutter adjustably secured to said shaft, each of said shutters being adapted to cut off substantially one half of a beam of light, an adjusting rod supported by said projector and having faces in the path of movement of said shutters, said faces being on the optical axis of said projector and serving as a means to indicate the position in which each of said shutters should be in order for them to cut simultaneously the center line of said beam of light, a lens holder, a barrel insertable in said lens holder and carrying said adjusting rod, said adjusting rod extending through the center of said barrel, and means for clamping and centering said barrel in said lens holder.

11. In a motion picture projector, a rotatable shaft, a front and a rear shutter adjustably secured on said shaft and adapted to cut off intermittently a beam of light passing through said projector, an intermittent feed sprocket operatively connected with said rotatable shaft, a pointer movable with said sprocket so as to indicate when the shaft has been rotated to the point where further rotation thereof would rotate the sprocket, and an adjusting rod secured in such a position so that when the cutting edges of said shutters are moved against the rod and the shaft is in position where further rotation thereof would rotate the sprocket, the shutters will be in adjusted position relative to its shaft so that when the shutters are secured to the shaft in said adjusted position, said shutters will cut simultaneously said beam of light and said intermittent sprocket would be rotated.

12. In a motion picture projector, a rotatable shaft, a front and a rear shutter adjustably secured on said shaft and adapted to cut off intermittently a beam of light passing through said projector, an intermittent feed sprocket operatively connected with said rotatable shaft, an indicator to indicate when said feed sprocket commences its operation, and a rod having portions thereof adapted to be contacted by the cutting edges of said shutters and secured in said projector in such a position as to indicate the position in which the shutters should be secured to said shaft so that the two shutters will cut the center line of said beam of light at the same time that said feed sprocket commences its operation.

13. In a motion picture projector, a rotatable shaft, a front and a rear shutter adjustably secured on said shaft and adapted to cut off intermittently a beam of light passing through said projector, an intermittent feed sprocket for a film, an indicator to indicate when said feed sprocket commences its operation, said shutter shaft and intermittent sprocket operating in synchronism, said indicator consisting of a pointer and spring means to detachably mount said indicator so that it will rotate with said sprocket.

14. In a motion picture projector, an intermittent feed sprocket, an indicator to show when said sprocket commences its operation, a rod provided with two diametrically extending flat faces, and held in said projector so that the flat faces will coincide with the optical axis of the projector, a continuously rotating shutter shaft, front and rear shutters adjustably secured to said shutter shaft, said feed sprocket and shutter shaft moving in synchronism, said flat faces serving as a guide against which one of the light cutting edges of each of said shutters should be positioned when the indicator is moved slightly on the commencement of the operation of the sprocket, and means to secure the shutters to the shutter shaft when thus adjusted.

15. In a motion picture projector, a rotatable shaft, a front and a rear shutter adjustably secured to said shaft and an adjusting rod removably mounted in the optical axis of said projector and having portions thereof so spaced as to be in the path of movement of said shutters and serving as a means to indicate where the shutters should be secured to said shaft.

HENRY F. HEIDEGGER.